(12) United States Patent
Rydström

(10) Patent No.: US 8,500,206 B2
(45) Date of Patent: Aug. 6, 2013

(54) MECHANICAL TAILGATE

(75) Inventor: Lars Rydström, Örebro (SE)

(73) Assignee: Atlas Copco Rock Drills AB, Orebro (SE)

( * ) Notice: Subject to any disclaimer, the term of this patent is extended or adjusted under 35 U.S.C. 154(b) by 580 days.

(21) Appl. No.: 12/310,268

(22) PCT Filed: Aug. 24, 2007

(86) PCT No.: PCT/SE2007/000748
§ 371 (c)(1),
(2), (4) Date: Feb. 17, 2009

(87) PCT Pub. No.: WO2008/030155
PCT Pub. Date: Mar. 13, 2008

(65) Prior Publication Data
US 2009/0302629 A1     Dec. 10, 2009

(30) Foreign Application Priority Data
Sep. 6, 2006   (SE) ....................................... 0601827

(51) Int. Cl.
    *B62D 33/00*        (2006.01)
(52) U.S. Cl.
    USPC .......................... 298/23 MD; 298/23 S; 298/7
(58) Field of Classification Search
    USPC ............ 298/23 MD, 23 M, 23 S, 23 A, 23 D,
                  298/7; 296/51, 55, 57.1, 56, 61; 222/108
    See application file for complete search history.

(56) References Cited

U.S. PATENT DOCUMENTS

| 2,020,451 A | 11/1935 | Atwell |
| 2,249,932 A | 7/1941 | Beal |
| 2,751,096 A | 6/1956 | Darkenwald |
| 3,773,385 A | 11/1973 | Sandberg |
| 3,977,718 A | 8/1976 | Nordberg |
| 4,516,904 A | 5/1985 | Simmons |
| 5,823,630 A | 10/1998 | Graham |
| 6,893,099 B2 * | 5/2005 | O'Brien ...................... 298/23 D |

FOREIGN PATENT DOCUMENTS

| CA | 2 339 312 C | 2/2000 |
| CH | 565071 | 8/1975 |
| DE | 87 14 706 | 12/1987 |
| FR | 2843344 A1 | 2/2004 |
| WO | WO 00/09383 | 2/2000 |

* cited by examiner

*Primary Examiner* — Stephen Gordon
(74) *Attorney, Agent, or Firm* — Mark P. Stone

(57) ABSTRACT

A mechanical tailgate (3) for a dump body (1) of an underground truck, the purpose of the mechanical tailgate is to increase the loading capacity of the dump body, which mechanical tailgate is pivotably arranged between an opened and a closed position, comprising a tailgate sheet (4) attached to two lifting arms (5), which are pivotably arranged to the dump body (1), the dump body (1) comprises also a controlled tailgate (2) arranged to be controlled between opened and closed position of the dump body, the opening and closing movement of the controlled tailgate (2) is effected in the form of a circular movement. In the closed position of the mechanical tailgate (3) and the controlled tailgate (2), the tailgate sheet (4) and the controlled tailgate (2) are arranged to be positioned overlapping each other in such a way that a lower edge of the tailgate sheet (4) is placed on the inside of an upper edge of the controlled tailgate (2) for locking the tailgate sheet (4) towards the controlled tailgate (2).

12 Claims, 3 Drawing Sheets

MECHANICAL TAILGATE

FILED OF THE INVENTION

The invention relates to a mechanical tailgate for a dump body of an underground truck. The invention also relates to a dump body having such mechanical tailgate.

BACKGROUND OF THE INVENTION

To be able to unload a dump body of an underground truck, for instance, the dump body is provided with a controlled tailgate adapted to be moved between a closed and an opened position. The dump body can either be pivotably or fixed arranged at the underground truck. When the dump body is fixed arranged at the underground truck a so called ejector gate is placed at the front end of the dump body and adapted to eject the cargo from the dump body when the controlled tailgate is in its opened position.

Particularly, at a type of underground truck, a so called teletram, which is provided with a fixed dump body and which is used for unloading cargo in areas with low ceiling height, in which area a pivotable dump body can not be used, the controlled tailgate moves downward towards the rear wheel unit, when the tailgate opens for unloading ore.

When the controlled tailgate of a teletram of the above-mentioned type is opened a problem arise in that the available distance of motion for opening the controlled tailgate is limited, i.e. the height from the ground to the bottom of the dump body is limited. This results in that the cargo/ore that can be loaded on the dump body is limited to height of controlled tailgate. The side walls of the dump body are usually higher than the height of controlled tailgate in its closed position. Therefore, the rear portion of the side walls of the dump body usually inclines obliquely backward towards the upper edge of the controlled tailgate, whereby a dead space is formed where no cargo can be loaded.

A way of reducing this problem at known teletrams is to the design the controlled tailgate in the form of a circular arc, and to let a portion of the lower part of the arc-shaped, controlled tailgate to move in a circular movement in between the rear wheel unit of the teletram. In this way it is possible to increase the height of the controlled tailgate and thereby the loading capacity of the dump body. However, the height of the tailgate remains lower than the height of the side walls of the dump body.

It has now turned out that it would be desirable to increase the loading capacity of the dump body, preferably by increasing the height of the tailgate, whereby the side walls of the dump body may have the same height over its entire length.

SUMMARY OF THE INVENTION

The object of the invention is to eliminate or at least reduce the problem with the prior art and to arrange a mechanical tailgate, by which it is possible to increase the loading capacity of the dump body.

According to the invention this object is achieved with a mechanical tailgate of the above-mentioned type.

BRIEF DESCRIPTION OF THE DRAWINGS

The invention is more closely described below with reference to the accompanying drawings which show a non-limiting example of the invention and on which.

DESCRIPTION OF PREFERRED EMBODIMENTS

Figure 1:
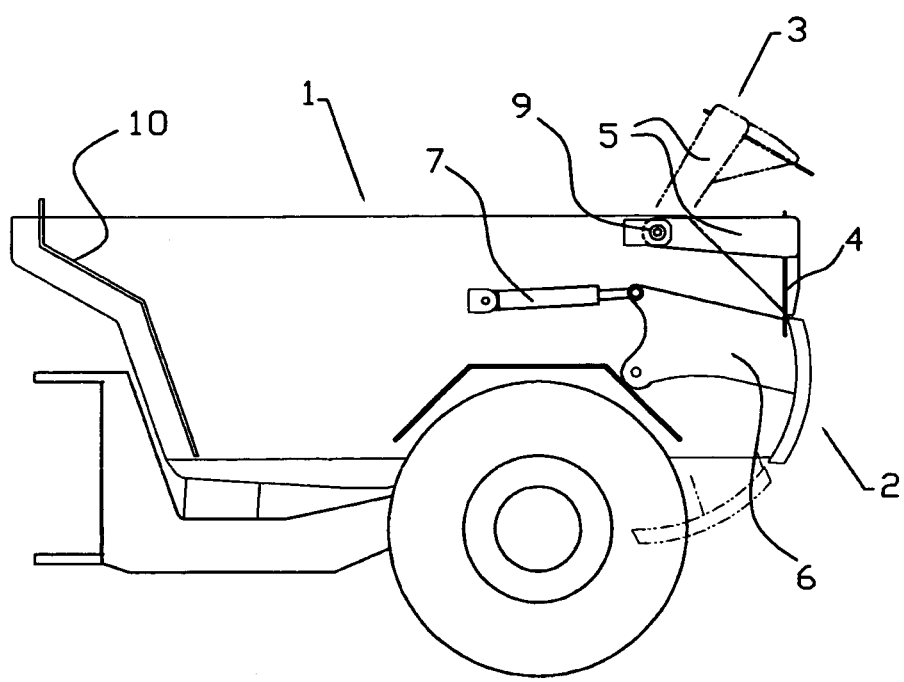
FIG. 1 is a side view of a dump body for an underground truck, which dump body is provided with a controlled tailgate and a mechanical tailgate according to the invention, and on which the closed position of the mechanical tailgate is shown by continuous lines and its opened position by dash dotted lines.

FIG. 1 shows a dump body 1 for an underground truck/teletram provided with on one hand a known, controlled tailgate 2 and on the other hand with a mechanical tailgate 3 according to the invention. By mechanical tailgate is meant a none-controlled tailgate, i.e. the gate is arranged to be raised by the forces exerted by the load on the tailgate 3 when the load is unloaded by, where appropriate, an ejector gate 10, and to return to its closed position by gravity. By controlled tailgate is meant a tailgate which by some means or devices is opened and closed on demand.

Although, in the description below, the inventive object is called a mechanical tailgate, it should be mentioned that said tailgate also can be controlled by for instance one or several hydraulic cylinders or by other means for opening and closing the tailgate, as will be described more closely below.

The mechanical tailgate 3 comprises an essentially vertical tailgate sheet 4 and two essentially horizontal lifting arms 5, side walls and necessary reinforcement and fastening means to reinforce, hold and attach the tailgate sheet 4 at the lifting arms 5. According to the invention either the lifting arms 5 or the tailgate sheet 4 are pivotably arranged at the dump body 1 by suitable hinging means 9, which are preferably arranged at the side walls of the dump body 1 and close to its rear upper edge. In a preferred embodiment the lifting arms 5 are pivotably arranged at the dump body 1. In the case the tailgate sheet 4 is pivotably arranged the lifting arms 5 form an elongation of the rear portion of the side walls of the dump body 1.

The controlled tailgate 2 is, as is known by the artisan, pivotably attached to the side walls of the dump body 1 by brackets 6 for opening and closing the controlled tailgate. Opening and closing of the controlled tailgate 2 is preferably, done as is known, by at least a device 7 such as hydraulic cylinders 7.

In FIG. 1 the opened position of the mechanical tailgate 3, i.e. the unloading position of a teletram, for instance, is shown by dash dotted lines. When unloading a teletram provided with the mechanical tailgate 3 according to the invention the controlled tailgate 2 is first lowered and the ejector gate 10 pushes the load out of the dump body. The force exerted by the ejector gate on the load will, depending on its height, lift and open the mechanical tailgate, and the mechanical tailgate will fall back by gravity to its closed, original position, when the load no longer effect the tailgate. In this position the flanges of the mechanical tailgate 3 rest against corresponding side edges of the dump body 1.

Figure 2:
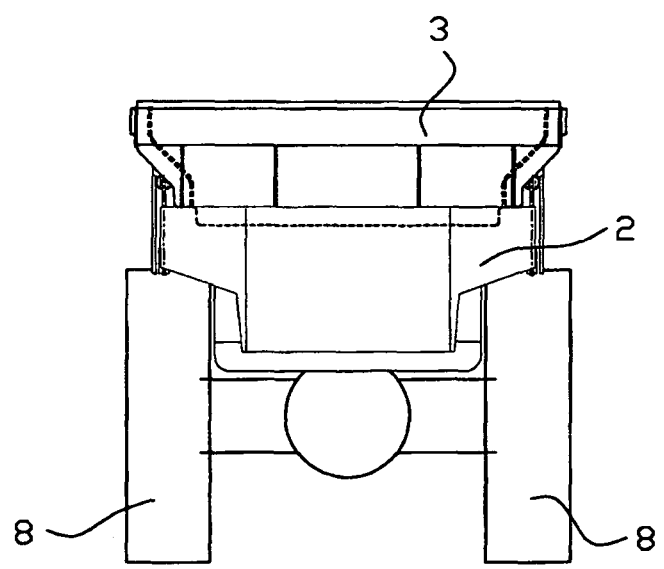
FIG. 2 is a view from behind of an underground truck, the dump body of which is provided with the mechanical tailgate according to the invention.

As can be inferred from FIG. 2 the dump body 1 is so designed that a lower part of the dump body is placed between one or several wheel units 8, and the controlled tailgate 2 is designed to fit the shape of the dump body, which means that a lower part of the tailgate 2, in its unloading position, is adapted to be placed between the rear wheel unit 8. See FIG. 1.

Figure 3:
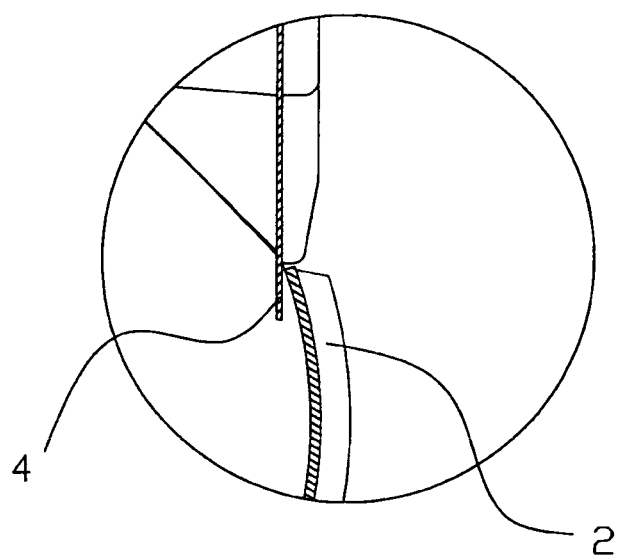
FIG. 3 is an enlarged detailed view of the locking of the mechanical tailgate according to the invention by means of the controlled tailgate.

The detailed view in FIG. 3 shows the mechanical tailgate 3 and the controlled tailgate 2 in closed position. In a preferred embodiment of the invention the tailgate sheet 4 and the controlled tailgate 2 overlap each other in such a way that the lower edge of the tailgate sheet 4 is placed on the inside of the upper edge of the controlled tailgate 2, seen in the rear direction of the dump body. It is preferred that the upper edge of the controlled tailgate 2 rest against the tailgate sheet 4 and a small distance upwards from the lower edge of the tailgate sheet. Other clamping mechanisms of the mechanical tailgate 3 are possible, in particular in the case the mechanical tailgate is provided with opening and closing means. These opening and closing means can have the from of hydraulic cylinders or for instance bars (not shown) which are arranged to operate between the brackets 6 of the controlled tailgate 2 and the lifting arms 5 of the mechanical tailgate 3 or on the tailgate sheet 4.

By means of the mechanical tailgate 3 according to the invention it is possible to fill up the dead space which otherwise will be present since the rear ends of the side walls of the dump body 1 slope obliquely towards the controlled tailgate 2.

The invention claimed is:

1. A mechanical tailgate for a dump body of an underground truck, the purpose of the mechanical tailgate is to increase the loading capacity of the dump body, which mechanical tailgate is pivotably arranged between an opened and a closed position, comprising a tailgate sheet attached to two lifting arms, which are pivotably arranged to the dump body, the dump body comprises also a controlled tailgate arranged to be controlled between opened and closed positions of the dump body, said controlled tailgate being formed, at least in part, in a curved configuration, opening and closing movement of the controlled tailgate being made by a circular movement, wherein, in the closed position of the mechanical tailgate and the controlled tailgate, the tailgate sheet and the controlled tailgate are arranged to be positioned overlapping each other in such a way that a lower edge of the tailgate sheet is placed on the inside of an upper edge of the controlled tailgate for locking the tailgate sheet towards the controlled tailgate.

2. The mechanical tailgate according to claim 1, wherein at least one device is provided for opening and closing, respectively, the controlled tailgate.

3. The mechanical tailgate according to claim 2, wherein the device for opening and closing, respectively, of the controlled tailgate comprises at least one hydraulic cylinder.

4. The mechanical tailgate according to claim 3, wherein the device for opening and closing, respectively, the controlled tailgate comprises at least one bar operable between a bracket of the controlled tailgate and a lifting arm of the mechanical tailgate.

5. The mechanical tailgate according to claim 1, wherein the underground truck is a teletram.

6. Dump body of an underground truck, wherein the dump body is provided with a mechanical tailgate according to claim 1.

7. Dump body of an underground truck, wherein the dump body is provided with a mechanical tailgate according to claim 2.

8. Dump body of an underground truck, wherein the dump body is provided with a mechanical tailgate according to claim 3.

9. Dump body of an underground truck, wherein the dump body is provided with a mechanical tailgate according to claim 4.

10. A mechanical tailgate according, to claim 1, wherein said tailgate sheet and said controlled tailgate provide releasable locking means consisting of only said tailgate sheet and said controlled tailgate.

11. A mechanical tailgate according to claim 1, wherein said tailgate sheet and said controlled tailgate are configured to directly engage each other in said closed position of said controlled tailgate for releasably locking the controlled tailgate to the tailgate sheet.

12. A mechanical tailgate for a dump body of an underground truck, the purpose of the mechanical tailgate is to increase the loading capacity of the dump body, which mechanical tailgate is pivotably arranged between an opened and a closed position, comprising a tailgate sheet attached to two lifting arms, which are pivotably arranged to the dump body, the dump body comprises also a controlled tailgate arranged to be controlled between opened and closed positions of the dump body, opening and closing movement of the controlled tailgate being made by a circular movement, wherein, in the closed position of the mechanical tailgate and the controlled tailgate, the tailgate sheet and the controlled tailgate are arranged to be positioned overlapping each other in such a way that a lower edge of the tailgate sheet is placed on the inside of an upper edge of the controlled tailgate for locking the tailgate sheet towards the controlled tailgate, said tailgate sheet and said controlled tailgate being configured to directly engage each other in said closed position of said controlled tailgate for releasably locking the controlled tailgate to the tailgate sheet, wherein said controlled tailgate is formed, at least in part, in a curved configuration.

* * * * *